Patented June 14, 1932

1,862,899

UNITED STATES PATENT OFFICE

NILS ERIK LENANDER, OF LOKKEN VERK, NORWAY, ASSIGNOR TO PATENTAKTIEBOLAGET GRONDAL-RAMEN, OF STOCKHOLM, SWEDEN

TREATMENT OF FINELY DIVIDED SULPHIDE ORES

No Drawing.   Application filed July 26, 1930. Serial No. 471,101.

This invention relates to the treatment of finely divided sulphide ores, particularly of the pyrite type, and has for its object the provision of an improved method of treating such finely divided ores for the recovery of sulphur in elemental form and of such valuable metals as the ore may contain. By sulphide ore I mean to include any and all sulphur-bearing materials amenable to treatment in accordance with the principles of the invention such as ores, concentrates (particularly flotation concentrates) metallurgical products and the like.

The invention is particularly concerned with the treatment of finely divided sulphide ores in accordance with the method described in my copending patent application, Serial No. 471,097 filed July 26, 1930. By that method, sulphide ore, and more particularly a pyritic ore, is melted with appropriate flux and carbonaceous material in a blast furnace equipped for the withdrawal of the gaseous product without admixture with atmospheric air. The furnace operation is characterized by such composition of the charge and regulation and control of the operating conditions that the resulting molten products retain only such amount of sulphur as is required for satisfactory matte formation and such as is incidentally included in the slag, while the resulting gaseous product contains the remainder of the sulphur largely in the form of elemental sulphur. The gaseous product produced in and withdrawn from the furnace without admixture with air is subjected to appropriate treatment for the recovery therefrom in elemental form of substantially all of the sulphur therein.

The nature of the blast furnace operation requires that the charge be introduced therein substantially in the form of lumps with the avoidance as far as practicable of finely divided material. The treatment of substantial amounts of finely divided ore, such as flotation concentrates, is practically impossible. While various methods are available for agglomerating finely divided ores, such methods for the most part involve a greater or less loss of the sulphur content of the ore, as for instance in agglomerating by sintering where a considerable part of the sulphur is driven off and hence lost. Since one of the principal objects of treating a sulphide ore in accordance with the method under discussion is to recover the sulphur content of the ore in elemental form, any loss of sulphur in agglomerating reduces the economy of the process with respect to the recovery of sulphur.

The present invention contemplates the preparation for treatment in a blast furnace of finely divided sulphide ore without any attendant loss of sulphur. Thus, in accordance with the invention, the finely divided ore is formed into agglomerates possessing a relatively strong cementitious bond that imposes no additional burden on the furnace operation. The requisite cementitious bond is formed by mixing with the ore such cement-forming material as the ore itself may be deficient in. The resulting mixture is then agglomerated, preferably by briquetting, and the agglomerates are subjected to the action of steam under pressure whereupon the cementitious-forming materials are converted into a sufficiently strong bond for satisfactory blast furnace treatment of the agglomerates.

Satisfactory agglomerates for the practice of the invention may be made by mixing the finely divided ore, say a flotation concentrate, with a small percentage of lime, say 3 to 4%, and such amount of silica as may be required to form a satisfactory binder with the lime in the subsequent steam pressure treatment. Where the ore contains silicious matter, it may be that no additional silica is required to provide the necessary cementitious-forming ingredients. Sufficient water is added to the mixture to produce a plastic mass suitable for agglomerating. While I prefer to agglomerate by briquetting, any other appropriate manner of forming the mass into suitably sized lumps may be employed. The briquettes or agglomerates are then placed in gastight steel cylinders, or other appropriate containers, and heated under a steam pressure of 6 to 8 atmospheres (about 150° C.), whereupon the lime and silica form a strong cement-like binder and the resulting briquettes are suitable for blast furnace operation. The lime and silica (if necessary) added as cementitious-forming material constitute no burden in the blast furnace operation, since they contribute to the flux required in the smelting charge.

While the invention is of particular advantage in the method of treating sulphide ore in accordance with the principles of my aforementioned application, it is equally applicable to the treatment of sulphide ores in any blast furnace operation where the sulphur content of the ore is to be recovered in elemental form from the gaseous product of the furnace operation.

I claim:—

1. In the process of treating a finely divided sulphide ore in a blast furnace with the production and withdrawal therefrom of a gaseous product containing elemental sulphur, the preparation of said finely divided ore for introduction into said furnace which comprises mixing cementitious-forming material with the ore in sufficient quantity to form a strong bond, agglomerating the resulting mixture, and subjecting the resulting agglomerates to the action of steam under pressure whereby a cementitious bond is formed within the agglomerates.

2. In the process of treating a finely divided sulphide ore in a blast furnace with the production and withdrawal therefrom of a gaseous product containing elemental sulphur, the preparation of said finely divided ore for introduction into said furnace which comprises mixing lime and silica (if necessary) with the ore in sufficient quantity to form a cementitious bond, agglomerating the resulting mixture, and subjecting the resulting agglomerates to the action of steam under pressure to form the lime and silica into a strong cementitious bond.

3. In the process of treating a flotation concentrate in a blast furnace with the production and withdrawal therefrom of a gaseous product containing elemental sulphur, the preparation of said concentrate for introduction into said furnace which comprises mixing lime and silica (if necessary) with the concentrate in sufficient quantity to form a strong bond, agglomerating the resulting mixture, and subjecting the resulting agglomerates to the action of steam under a pressure of about 6 to 8 atmospheres whereupon the lime and silica form a strong cement-like bond.

In testimony whereof I have signed my name to this specification.

NILS ERIK LENANDER.